United States Patent [19]

Ryan

[11] 3,972,484
[45] Aug. 3, 1976

[54] HAY STACK DISINTEGRATING APPARATUS
[75] Inventor: Kelly P. Ryan, Blair, Nebr.
[73] Assignee: Blair Manufacturing Company, Blair, Nebr.
[22] Filed: Aug. 8, 1975
[21] Appl. No.: 603,106

[52] U.S. Cl.............................. 241/154; 241/101 A; 241/101.7; 241/189 R
[51] Int. Cl.² .......................................... B02C 13/20
[58] Field of Search......... 241/101 A, 101.7, 152 R, 241/152 A, 154, 186 A, 186.3, 186.4, 189 R

[56] References Cited
UNITED STATES PATENTS

| 2,989,252 | 6/1961 | Babb | 241/101 A |
| 3,863,850 | 2/1975 | Freeman | 241/101.7 |
| 3,926,378 | 12/1975 | Ryan | 241/101 A |

Primary Examiner—Granville Y. Custer, Jr.
Attorney, Agent, or Firm—Wegner, Stellman, McCord, Wiles & Wood

[57] ABSTRACT

The present invention provides an apparatus for cutting the long stalks making up a hay stack into short sections more suitable for cattle feed. The arrangement includes a vertical array of disintegrating rolls for breaking up the hay stack and delivering the stems to a plurality of material distributing devices which distribute and feed the stems in a uniform fashion to a cutter roll which chops the stems into short lengths. In the operation of the apparatus, the stems making up the hay may be delivered repeatedly to the cutter roll to assure cutting to the proper length.

4 Claims, 6 Drawing Figures

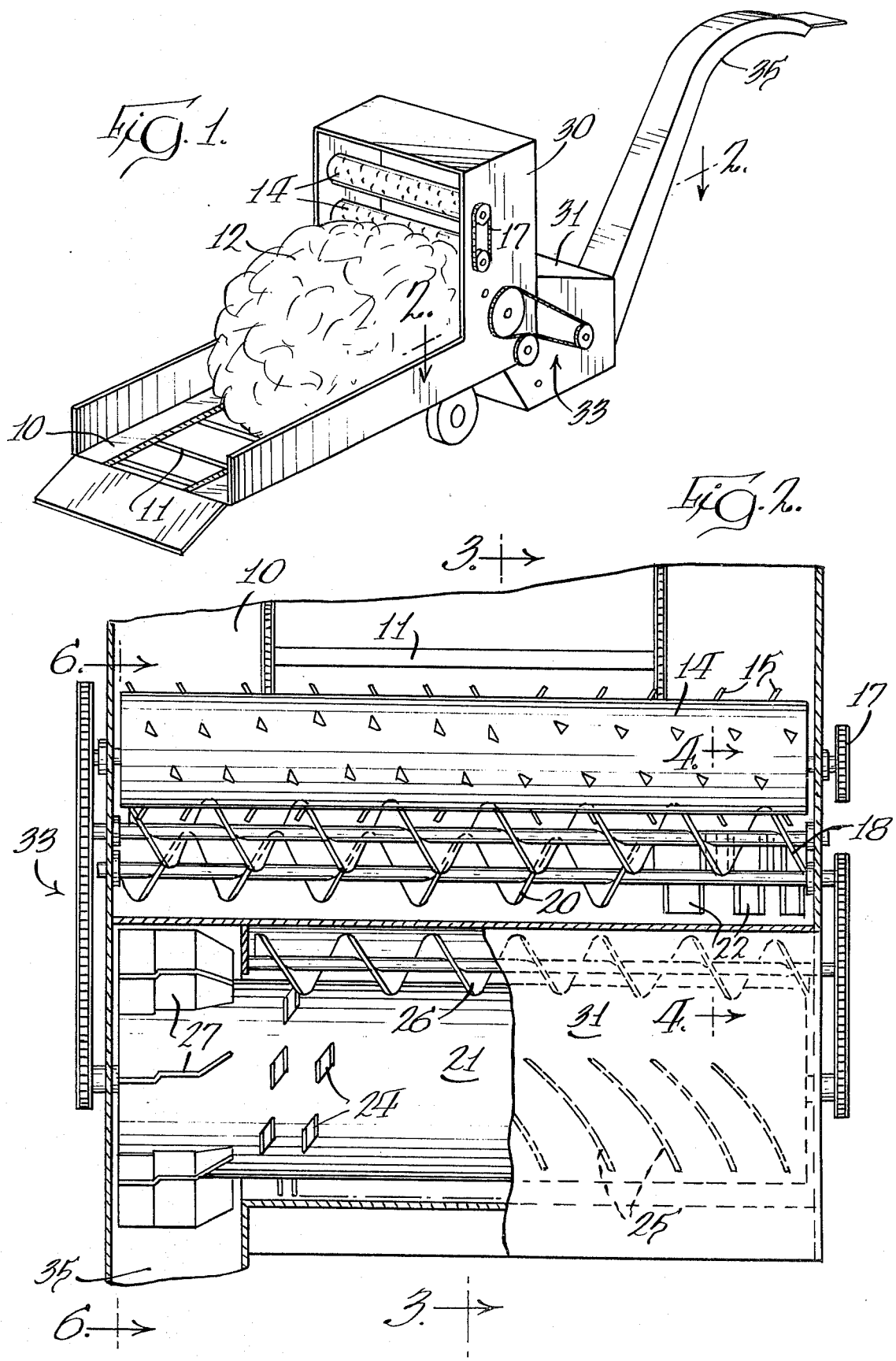

HAY STACK DISINTEGRATING APPARATUS

BACKGROUND OF THE INVENTION

In modern ranching, hay stacks are formed by specially designed machines which travel across the field gathering up windrows of hay and compactly packing the hay into a stack which is then discharged from the device. The resulting hay stack is an integrated structure far stronger than the old fashioned handmade hay stacks and not only serves to provide its own shelter from the elements, but also can be picked up and moved about without destroying the integrity of the stack.

Due to the efficiency of the hay stack making machine, the stems of the hay are normally unbroken and may have substantial length, and the hay as such is not as suitable for cattle feed as short cut hay, i.e., hay cut into short lengths. Due to the high cost of cattle feed such as corn, the importance of hay as fodder is rapidly increasing, and the particular hay stack disintegrating apparatus of the present invention finds it most efficient use in cattle feeding operations, particularly in conjunction with feed lot type operations.

SUMMARY OF THE INVENTION

While apparatus for disintegrating hay stacks has been known, there has remained the problem of obtaining uniformly short (2 to 4 inches) cut hay. In many cases, the hay, after passing through a disintegrating system, is of varied lengths, up to as much as 12 inches and more. This provides a nonuniform feed, is wasteful, and is not as readily eaten by cattle. In accordance with the present invention, however, a uniform short length of hay is obtained by the cooperation of apparatus for first breaking the hay stack into smaller clumps, which are then distributed uniformly, and fed uniformly into a cutter roll. The arrangement of the present invention is such as to introduce hay into the cutter roll a number of times in order that successive cuttings may occur to reduce the hay to the proper length. From the cutter roll the short cut hay is discharged for transportation to a feeding area.

DESCRIPTION OF THE DRAWINGS

FIG. 1 is a side elevational view of an entire hay disintegrating apparatus in accordance with the present invention;

FIG. 2 is an enlarged vertical section taken along line 2—2 of FIG. 1;

DESCRIPTION OF THE PREFERRED EMBODIMENT

Figure 3:
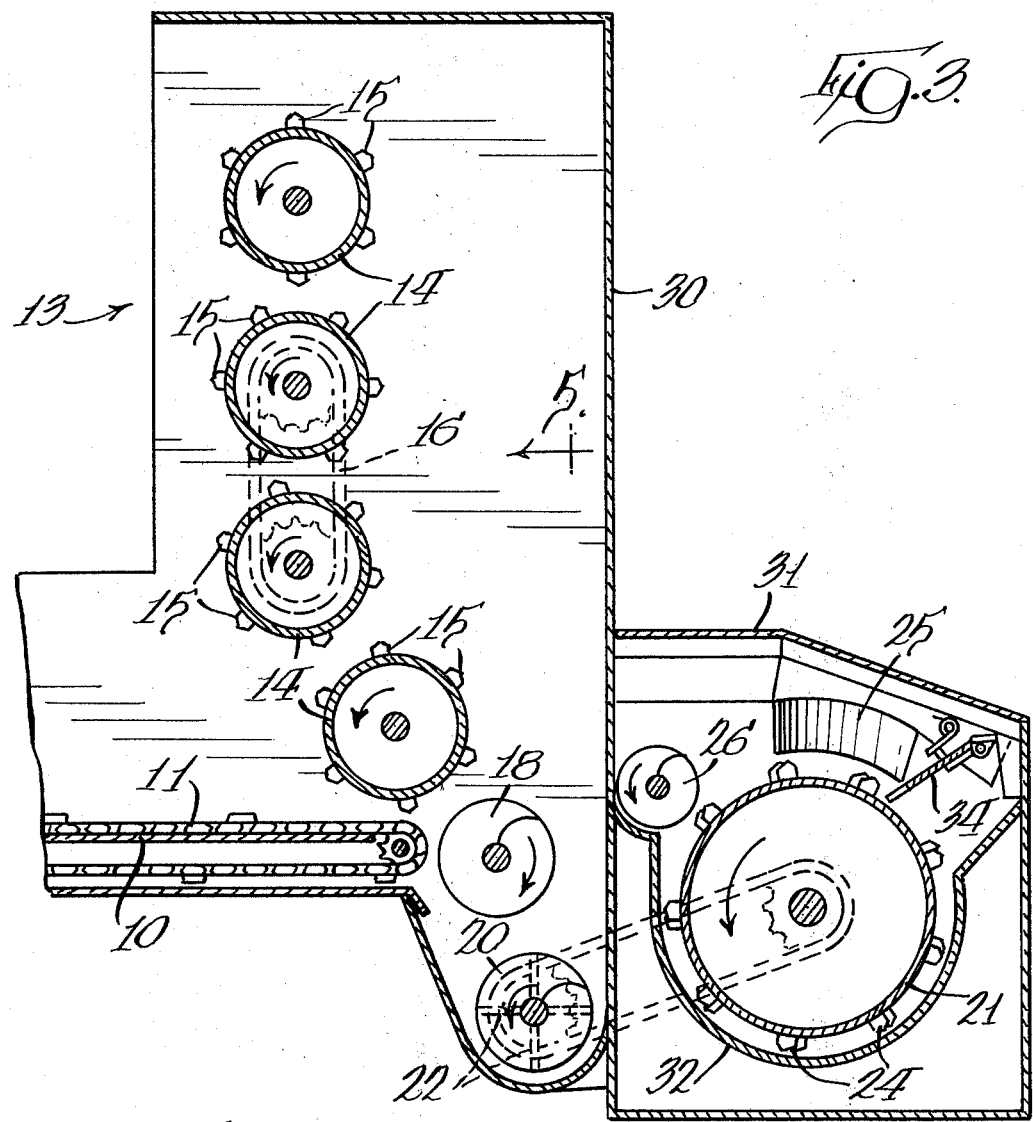
FIG. 3 is a vertical section taken along line 3—3 of FIG. 2.

Referring now to the drawings, there is shown a bed 10 mounted on wheels and suitable for transport by a tractor or other mode of power. Extending along the bottom of the bed is a conveyor 11 for moving a hay stack 12 into a vertical array 13 of a plurality of disintegrating rolls 14. The rolls 14 extend transversely of the bed and of the direction of movement of the hay stack, and extend substantially from side to side of the bed. Each of the rolls 14 is provided with a plurality of disintegrating teeth 15 and means in the form of a chain drive 16 and 17 are provided for rotating the rolls.

Extending from side to side of the bed 10 beneath the vertical array 13 of the disintegrating rolls is a first material distributing means in the form of an auger 18 mounted to receive hay disintegrated by the rolls 14 and arranged to deliver the hay from right to left, as seen in FIG. 2. From the first material distributing means the hay falls to a second material distributing means in the form of an auger 20 extending parallel to but below the auger 18 and arranged to move hay from left to right, as seen in FIG. 2.

Figure 4:
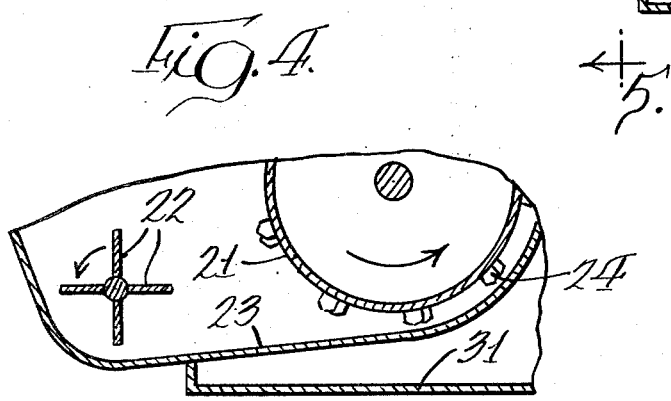
FIG. 4 is an enlarged vertical sectional view taken along line 4—4 of FIG. 2.
Figure 5:
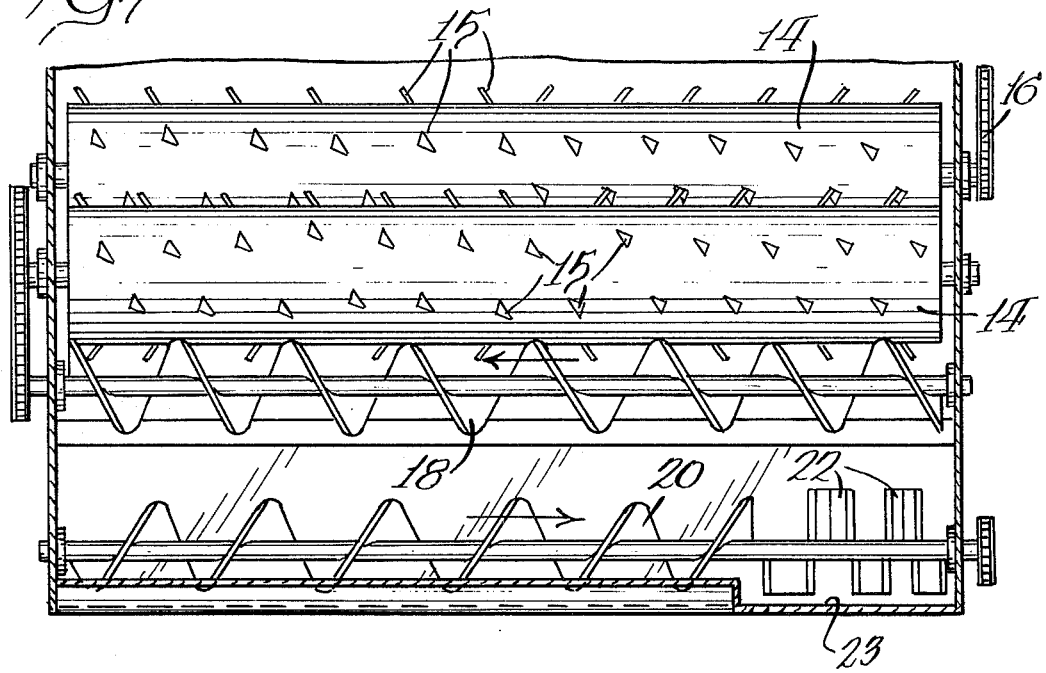
FIG. 5 is a vertical section taken along line 5—5 of FIG. 3.
Figure 6:
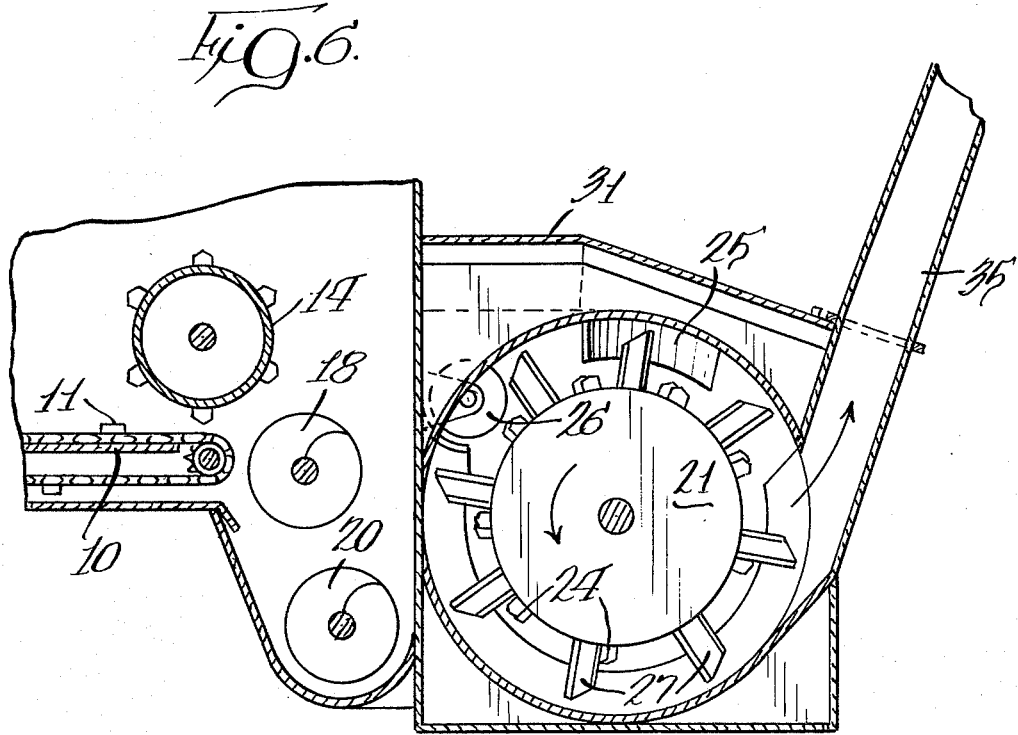
FIG. 6 is a vertical section taken along line 6—6 of FIG. 2.

The disintegrating rolls 14, while serving to break up the hay stack as it is fed into the rolls, often pulls out large chuncks or clumps of hay and thus the feed of the material from the disintegrating rolls is far from uniform. By means of the material distributing means in the form of augers 18 and 20, the feed of hay is evened out and rendered substantially uniform. Thus, a uniform quantity of hay is constantly delivered to the right-hand side of the apparatus by the auger 20. The hay so delivered is directed into the right-hand portion of a cutter roll 21, with the delivery being assisted by a number of paddles 22 secured to the shaft which carries the auger 20. As seen in FIG. 4, the material from the paddles is moved along a floor 23 into the path of movement of the teeth 24 arranged in slanting rows on the cutter roll 21. The teeth 24 chop the hay fed thereinto and move it along from right to left as seen in FIG. 2, with this movement being assisted by a number of baffle plates 25 secured to the interior of the housing enclosing the cutter roll.

A third material distributing means in the form of an auger 26 is positioned slightly above the cutter roll the cutter roll 21 and serves to move hay from right to left in FIG. 2. The arrangement, however, is such that large lengths of hay picked up by the auger 26 are again dropped into the path of movement of the teeth on the cutter roll and thus are re-chopped by the cutter. Thus, each particular stalk of hay may be cut a number of times by the cutter roll. The general movement of the hay is from right to left as seen in FIG. 2, due to the combined action of the auger 26 and the cooperation of the slanted rows of teeth 24 and the baffles 25, with the hay being cut and re-cut during its progress. The left-hand end of the cutter roll 21 is provided with propeller devices 27 rather than teeth, with the devices 27 serving as a blower with rapid rotation of the cutter roll.

Enclosing all of the apparatus just mentioned is a housing 30 extending upwardly from the bed, and a housing 31 enclosing the cutter roll, baffles, and auger 26. A shroud 32 surrounds the cutter roll to assure intimate contact between the hay and the teeth of the cutter, and cooperates with a comb-like device 34 to aid in the cutting. From the blower formed by the propellers 27, the hay is discharged into a discharge chute 35 for delivery as desired. The entire apparatus may be driven by mean of a drive system 33 from an external source of power takeoff or engine.

I claim:

1. Apparatus for reducing a hay stack to a short length cattle feed comprising an elongated bed, a vertical array of disintegrating rolls rotatably mounted at one end of the bed, a conveyor for moving a hay stack on the bed into said disintegrating rolls, a first material distributing means extending across the bed below the disintegrating rolls and adapted to move material disintegrated by the rolls in one direction across the bed, a second material distributing means beneath the first material distributing means and adapted to move material received from said first material distributing means across the bed in the opposite direction, a rotatably mounted cutter roll positioned to receive material from said material distributing means, means for moving material transversely across the face of the cutter roll toward on end thereof, and a material discharge means at said end of the cutter roll.

2. Apparatus for reducing a hay stack to a short length cattle feed comprising an elongated bed, a vertical array of disintegrating rolls rotatably mounted at one end of the bed, a conveyor for moving a hay stack on the bed into said disintegrating rolls, a first auger extending across the bed below the disintegrating rolls and arranged to move material disintegrated by the rolls in one direction across the bed, a second auger beneath the first auger and arranged to move material received from the first auger across the bed in the opposite direction, a rotatably mounted toothed cutter roll positioned to receive material from said augers, means for moving material transversely across the face of the cutter roll toward one end thereof, and a material discharge means at said end of the cutter roll.

3. Apparatus for reducing a hay stack to a short length cattle feed comprising an elongated bed, a vertical array of disintegrating rolls rotatably mounted at one end of the bed, a conveyor for moving a hay stack on the bed into said disintegrating rolls, a first auger extending across the bed below the disintegrating rolls and arranged to move material disintegrated by the rolls in one direction across the bed, a second auger beneath the first auger and arranged to move material received from the first auger across the bed in the opposite direction, a rotatably mounted toothed cutter roll positioned to receive material from said augers, a third auger positioned parallel to but above the cutter roll to receive material from the cutter roll and reintroduce it thereinto, said third auger serving to move material transversely of the cutter roll toward one end thereof, and material discharge means at the end of the cutter roll.

4. Apparatus for reducing a hay stack to a short length cattle feed comprising an elongated bed, a vertical array of disintegrating rolls rotatably mounted at one end of the bed, a conveyor for moving a hay stack on the bed into said disintegrating rolls, a first auger extending across the bed below the disintegrating rolls and arranged to move material disintegrated by the rolls in one direction across the bed, a second auger beneath the first auger and arranged to move material received from the first auger across the bed in the opposite direction, a rotatably mounted toothed cutter roll positioned to receive material from said augers, a third auger positioned parallel to but above the cutter roll to receive material from the cutter roll and reintroduce it thereinto, said auger serving to move material transversely of the cutter roll toward one end thereof, a plurality of paddles carried by the second auger adjacent the end thereof to toss material into the teeth of the cutter roll, and a plurality of propellers at said end of the cutter roll arranged to form a blower to blow cut hay exiting from the cutter roll into a discharge device.

* * * * *